(No Model.)
T. W. FOSTER.
MANUFACTURE OF TABLE FORKS AND SPOONS.
No. 303,995. Patented Aug. 26, 1884.
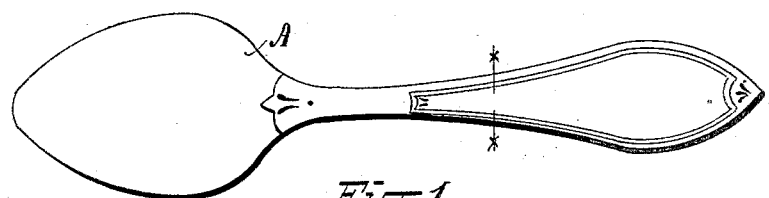
Fig. 1.
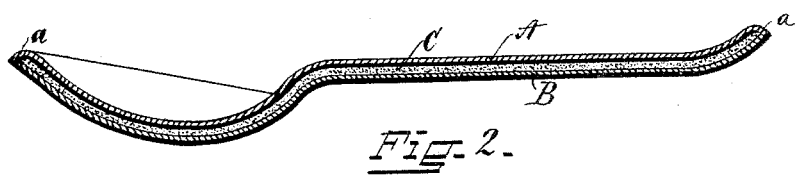
Fig. 2.
Fig. 3.
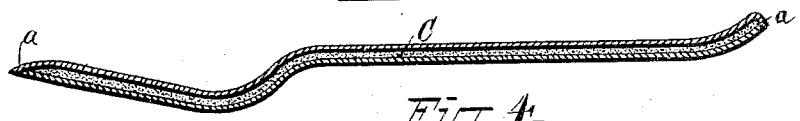
Fig. 4.
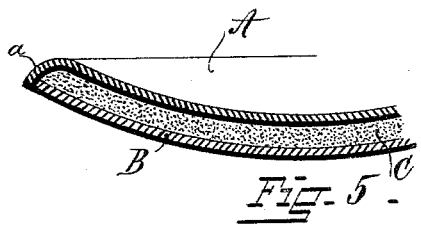
Fig. 5.
Fig. 6.
WITNESSES:
Joseph J. Scholfield
Israel Plummer
INVENTOR
Theodore W. Foster
per S. Scholfield
attorney.

UNITED STATES PATENT OFFICE.

THEODORE W. FOSTER, OF PROVIDENCE, RHODE ISLAND.

MANUFACTURE OF TABLE FORKS AND SPOONS.

SPECIFICATION forming part of Letters Patent No. 303,995, dated August 26, 1884.

Application filed March 10, 1884. (No model.)

*To all whom it may concern:*

Be it known that I, THEODORE W. FOSTER, of Providence, in the State of Rhode Island, have invented an Improved Manufacture of Gold-Plated Table Forks and Spoons, of which the following is a specification.

My invention relates to a new manufacture of gold-plated table forks and spoons, which consists in the combination of front and back plates made in hollowed form of rolled-gold-plated stock with an intervening filling of either hard or soft solder.

Figure 1 represents a face view of the spoon. Fig. 2 is a central longitudinal section of the same. Fig. 3 represents a face view of the fork. Fig. 4 is a longitudinal section of the same. Fig. 5 represents an enlarged section of a portion of the bowl of the spoon, Fig. 1. Fig. 6 represents a section taken in the line $x$ $x$ of Figs. 1 and 3.

In the accompanying drawings, A represents the front plate of a spoon, which is made in hollowed form by striking the edges $a$ downward, as shown in Figs. 5 and 6. The back plate, B, is made in a less-hollowed form, as shown in Fig. 6, and cut out to fit within the turned edges of the front plate. The two plates are then flushed with either hard or soft solder C, and secured to each other by properly heating the soldered plates, after which the outline edge of the upper plate is to be burnished, thus properly extending the gold-coating of the front plate in order to cover the base-metal edge of the same. The handle of the spoon may be embossed or otherwise ornamented, as desired. The table-fork, Figs. 3 and 4, is made in a similar manner by joining the front and back plates of rolled-gold-plated stock by means of the hard or soft solder filling C, and the handle D may be strengthened by means of a piece of wire or of rolled metal embedded in the filling C of solder.

The object of my invention is to provide a manufacture of gold-plated table forks and spoons, in which the desirable appearance of a gold fork or spoon may be secured at a comparatively low cost, and I have discovered in practice that forks and spoons so manufactured are of sufficient strength and durability to meet the requirements of ordinary use and wear owing to the roll-hardened-gold surface, the wearing qualities of which are greatly superior to that of an electro-gilded surface.

I claim as my invention—

As a new article of manufacture, a gold-plated table fork or spoon consisting of a front plate of rolled-gold-plated stock and a back plate of the same material joined to the front plate by means of an intervening filling of solder.

THEODORE W. FOSTER.

Witnesses:
LEANDER R. BRIGGS,
SOCRATES SCHOLFIELD.